(12) United States Patent
Requicha et al.

(10) Patent No.: US 6,508,979 B1
(45) Date of Patent: Jan. 21, 2003

(54) LAYERED NANOFABRICATION

(75) Inventors: Aristides A. G. Requicha, Manhattan Beach, CA (US); Bruce E. Koel, Los Angeles, CA (US); Roland Resch, Villach (AT); Diana Lewis, Long Beach, CA (US); Mark E. Thompson, Anaheim, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 09/608,634

(22) Filed: Jun. 30, 2000

Related U.S. Application Data
(60) Provisional application No. 60/181,122, filed on Feb. 8, 2000.

(51) Int. Cl.[7] .................................................. B22F 7/02
(52) U.S. Cl. ........................................................ 419/7
(58) Field of Search ................................ 419/6, 7, 8, 9

(56) References Cited

U.S. PATENT DOCUMENTS

| | | | | |
|---|---|---|---|---|
| 5,204,055 A | * | 4/1993 | Sachs et al. ................... | 419/2 |
| 5,207,371 A | * | 5/1993 | Prinz et al. ................... | 225/125 |
| 5,598,308 A | * | 1/1997 | Dieny et al. .................. | 360/113 |
| 5,687,679 A | * | 11/1997 | Mullin et al. ............. | 123/41.79 |
| 5,738,817 A | | 4/1998 | Danforth et al. | |
| 5,805,971 A | * | 9/1998 | Akedo ............................ | 419/6 |
| 5,900,207 A | * | 5/1999 | Danforth et al. ............. | 264/603 |
| 5,972,069 A | * | 10/1999 | Maekawa et al. .............. | 75/248 |

OTHER PUBLICATIONS

Condensed Chemical Dictionary, 10th ed., 1981, p. 919.*

* cited by examiner

Primary Examiner—Daniel J. Jenkins
(74) Attorney, Agent, or Firm—Fish & Richardson P.C.

(57) ABSTRACT

A method for fabricating or prototyping a nanoscale object is disclosed. The method includes defining a sequence of nanolayers that represent the nanoscale object, constructing a current nanolayer on a first surface, and depositing a sacrificial layer to cover the first surface but not the nanolayer. The nanolayer represents a slice of the nanoscale object. The nanolayer and the sacrificial layer provide a second surface on which a next nanolayer is constructed. The above construction and deposition steps are repeated if the next nanolayer is not the last nanolayer. The method also includes removing the sacrificial layers to produce the nanoscale object.

26 Claims, 3 Drawing Sheets

LAYERED NANOFABRICATION

CROSS-REFERENCE TO RELATED APPLICATION

This application claims benefit of the priority of U.S. Provisional Application Serial No. 60/181,122, filed Feb. 8, 2000, and entitled Layered-Nano Fabrication (NFL).

BACKGROUND

The present disclosure generally relates to layered fabrication and more specifically, to layered fabrication of nanoscale objects.

In manufacturing, productivity is achieved by guiding a product from concept to market quickly and inexpensively. Rapid prototyping aids this process. Rapid prototyping may automate the fabrication of a prototype part from a three-dimensional (3-D) computer model.

One type of rapid prototyping, referred to as layered fabrication, has been in use for production of macroscopic objects. In layered fabrication, an object is conceptually sliced into a set of parallel layers or slices. Each layer is produced sequentially, and the consolidation of all the layers constitutes the desired 3-D object.

SUMMARY

A method for fabricating or prototyping a nanoscale object is disclosed. The method includes defining a sequence of nanolayers that represent the nanoscale object, constructing a current nanolayer on a first surface, and depositing a sacrificial layer to cover the first surface but not the nanolayer. The nanolayer represents a slice of the nanoscale object. The nanolayer and the sacrificial layer provide a second surface on which a next nanolayer is constructed. The above constructing and depositing steps are repeated if the next nanolayer is not the last nanolayer. The method also includes removing sacrificial layers to produce the nanoscale object.

The construction of a current nanolayer includes depositing a plurality of nanoparticles and manipulating the nanoparticles into a specified shape. The manipulation of the particles may be performed with a microscope tip such as a scanning probe microscope tip.

The deposition of a sacrificial layer includes arranging self-assembled monolayers of molecules into a well-ordered pattern. The construction of the current nanolayers and the monolayers provide a smooth surface on which a next nanolayer may be constructed. The sacrificial layer may also be formed by electrostatically depositing strands of polymers.

The removal of molecular layers includes oxidizing the layers with ozone under ultraviolet radiation.

BRIEF DESCRIPTION OF THE DRAWINGS

Different aspects of the disclosure will be described in reference to the accompanying drawings wherein.

DETAILED DESCRIPTION

A process for fabricating three-dimensional (3-D) objects using layered fabrication technique has been extended to the nanoscale. The process, referred to as Layered Nanofabrication, enables fabrication of 3-D objects with overall dimensions in the deep sub-micron range. A nanoscale object is defined in the disclosure as any object that can be entirely enclosed within a box with length, width, and height on the order of about 100 nm.

Figure 1:
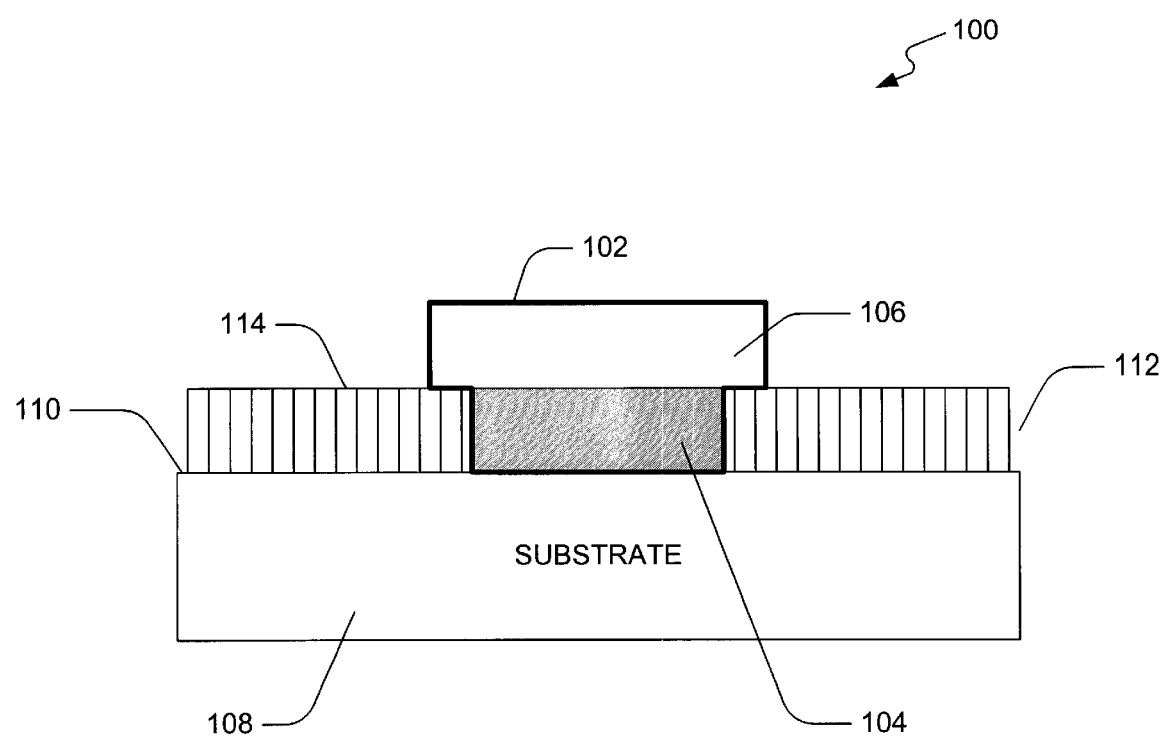
FIG. 1 illustrates a Layered Nanofabrication process in accordance with an embodiment of the present invention.

A Layered Nanofabrication process 100 is illustrated in FIG. 1 in accordance with an embodiment. In the illustrated embodiment, a nanoscale object 102 is conceptually sliced into several parallel layers referred to as nanolayers 104, 106. A sequence of sliced nanolayers 104, 106 is then defined and built.

A substrate 108 is provided on which a first layer 104 of the nanoscale object 102 may be constructed. In some embodiments, the substrate 108 is a hydroxylated material such as oxidized silicon or mica. In other embodiments, the substrate 108 is gold, silver, copper, platinum, silver oxide, or aluminum oxide. Nanolayers 104, 106 of the nanoscale object 102 have heights on the order of about a few nanometers.

A nanolayer 104 may be constructed on the substrate surface 110 as shown. The layer 104 may then be leveled off by constructing a sacrificial layer 112 that covers the substrate surface 110 but not the nanolayer 104. The sacrificial layer 112 may be constructed by depositing a layer of molecules. The height of the sacrificial layer 112 should be substantially equal to the height of the nanolayer 104. The construction of the nanolayer 104 and the sacrificial layer 112 provides a surface 114 on which a next nanolayer 106 may be constructed.

Figure 2A:
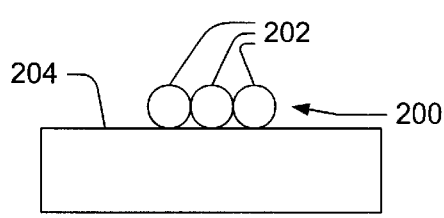
FIGS. 2A through 2F illustrate a detailed process for constructing a nanoscale object or structure.

In one embodiment illustrated in FIG. 2A, a first nanolayer 200 is constructed by depositing a large number of substantially similar nanoparticles 202 on the substrate surface 204. The particles 202 are on the order of about a few nanometers "nanoscale". These particles 202 are referred to as nanoparticles. The nanoparticles 202 may be manipulated with a scanning probe microscope (SPM). Manipulation of the nanoparticles 202, referred to as nanomanipulation, includes pushing and/or pulling of the nanoparticles 202 with the tip of the SPM to the desired locations. The nanomanipulation may also include positioning and linking of the nanoparticles 202. The resulting nanolayer 200 includes a collection of nanoparticles 202 that are in contact with adjacent nanoparticles 202.

Construction of the nanolayers using the above-described technique has been demonstrated experimentally in the laboratory for gold spherical nanoparticles with diameters between 5 and 30 nm. The gold particles are cross-linked and stabilized by treating them with short-length di-thiols.

Figure 2B:
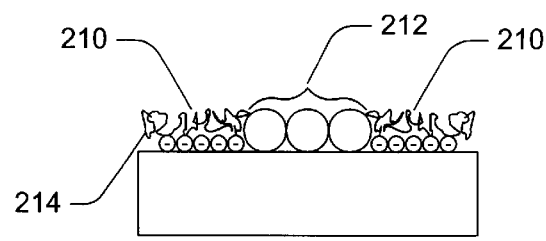

FIG. 2B illustrates one embodiment of constructing a sacrificial layer 210. The sacrificial layer 210 provides a surface for construction of the next nanolayer. Different sacrificial layers may be used for different substrate surfaces. For gold, silver, or copper substrates, thiols may be used as sacrificial layers. For platinum substrate, alcohols and amines may be used. For silver or aluminum oxide surfaces, carboxylic acids may be used.

In some embodiments, in which substrates have hydroxylated surfaces such as oxidized silicon or mica, molecular monolayers may be deposited on substrate surfaces. The monolayers may be self-assembled monolayers (SAM) that are prepared using different types of molecules. Some examples include molecular monolayers of silane or monolayers of alkylsiloxane. Different techniques are available to deposit appropriate concentration of these molecules so that the molecules assemble themselves into well-ordered, defect-free monolayers.

For example, a monolayer of silane may be synthesized so as to have the desired length to ensure that the sacrificial layer 210 is flush with the associated nanolayer 212. In order to build the sacrificial layer 210 that is flush with the nanolayer 212, several layers of SAM may need to be synthesized and deposited to produce a sacrificial layer with a desired thickness. However, depositing several layers of SAM may be time consuming. Thus, longer SAM may be designed and synthesized to simplify the construction of a sacrificial layer 210. The SAM attaches itself to the substrate surface but not the nanoparticles of the nanolayer 212.

The construction of a sacrificial layer 210 may use other techniques. For example, in the illustrated embodiment of FIG. 2B, substantially cationic and anionic polymers 214 may be assembled into high quality thin films by electrostatic deposition.

The deposition technique involves treating a charged substrate with a solution of an oppositely charged polymer. A monolayer of polymer is deposited on the substrate by electrostatic attraction of the surface for the polymer and the entropic gain of freeing the water from the surface and the polymer strand. Only one monolayer of polymer is bound to the surface because of the electrostatic repulsion of the polymer-coated surface toward another polymer strand. The substrate may then be removed from the solution, rinsed and placed in a polymer solution of an opposite charge. This oppositely-charged polymer attaches to the surface as a monolayer. Again, the polymer repels other polymer strands of like charge.

Treating the substrate alternately with two solutions allows the growth of films in regular and uniform increments. Each layer includes a polymer monolayer as thin as 1 nm. The films may be grown on any substrate surface.

Figure 2C:
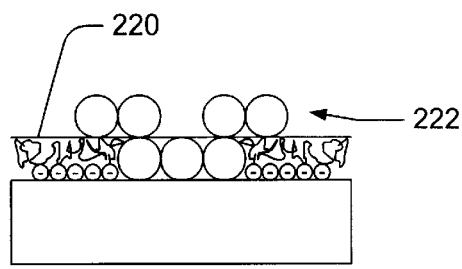
Figure 2D:
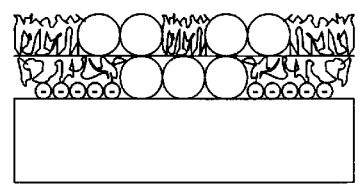
Figure 2E:
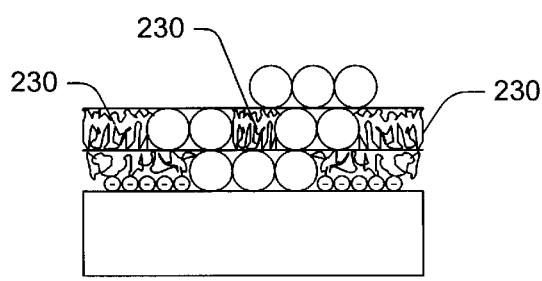
Figure 2F:
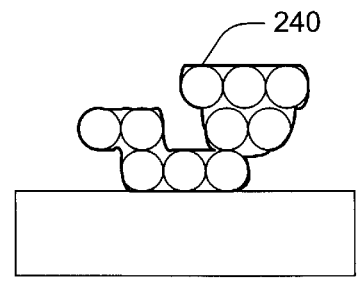

The top of the sacrificial layer may then serve as a surface 220 on which a next nanolayer 222 may be constructed (see FIG. 2C). Successive applications of the above-described processes are shown in FIGS. 2D and 2E for constructing the nanolayers and the corresponding sacrificial layers 230. FIG. 2F shows the nanoscale object 240 with the sacrificial layers 230 removed. The sacrificial layers 230 are removed using appropriate techniques as described below. If necessary, the nanolayers may be further fused to bolster the object 240. The nanolayers of gold nanoparticles or nanoclusters may fuse automatically. In some cases, it may be necessary to apply di-thiols. In other cases, it may be necessary to do some chemical, electrochemical, or thermal processing such as sintering, to fuse the nanolayers.

The sacrificial layers 230 may be removed at room temperature by oxidation using ozone in ultraviolet radiation. The organic components may be oxidized and removed as gaseous products. Small amounts of silicon may remain on the surface as silicon dioxide. The same process may substantially remove polymeric sacrificial layers.

Figure 3:
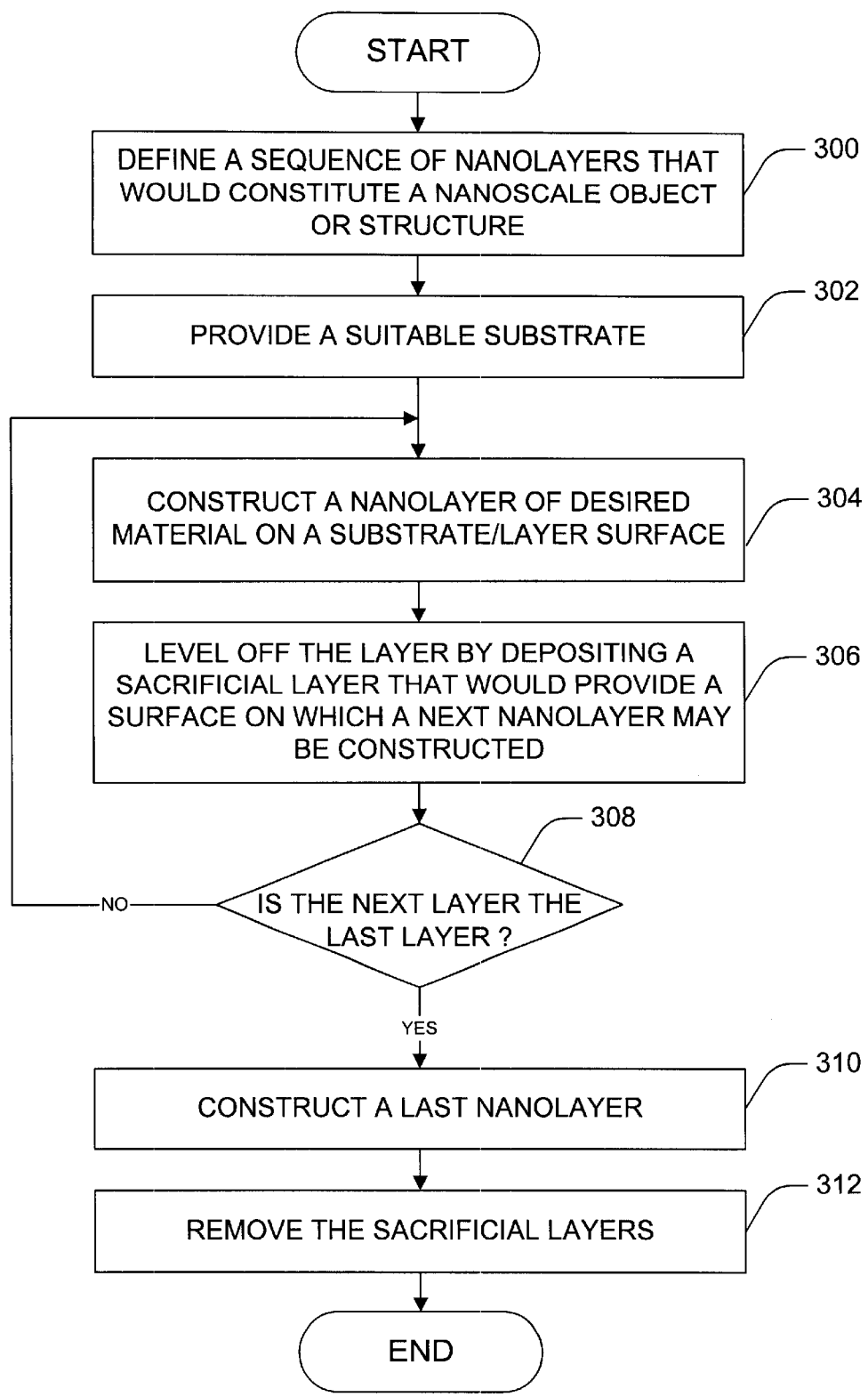
FIG. 3 is a flowchart of a method for constructing a nanoscale object in accordance with an embodiment of the present invention.

A method for constructing a nanoscale object in accordance with an embodiment is illustrated as a flowchart in FIG. 3. A sequence of nanolayers that would constitute a nanoscale object is defined at 300. At 302, a suitable substrate is provided. A nanolayer of desired material is constructed on a substrate or layer surface at 304. The layer is then leveled-off or planarized, at 306, by depositing a sacrificial layer that would provide a surface on which a next nanolayer may be constructed.

If the next layer is determined to be the last layer 308, a last nanolayer is constructed at 310. Otherwise, the layer construction process is repeated at 304. At 312, the sacrificial layers are removed to realize the nanoscale object or structure.

While specific embodiments of the invention have been illustrated and described, other embodiments and variations are possible. For example, although the invention has been described in terms of nanoscale objects and structures, objects and structures of other smaller or larger scale are possible and contemplated.

All these are intended to be encompassed by the following claims.

What is claimed is:

1. A method for fabricating a nanoscale object, comprising:
    constructing a current nanolayer on a first surface, said nanolayer representing a first slice of the nanoscale object;
    depositing a sacrificial layer to cover the first surface but not at least part of the nanolayer, such that said nanolayer and said sacrificial layer provide a second surface;
    using said second surface as a new first surface to deposit a next nanolayer;
    repeating said constructing, said depositing, and said using if the next nanolayer does not represent a last nanolayer; and removing sacrificial layers.

2. The method of claim 1, further comprising:
    defining a sequence of slices that represent the nanoscale object and include at least said first slice and said next slice.

3. The method of claim 2, wherein each slice of said sequence of slices is constructed as the current nanolayer.

4. The method of claim 1, wherein said constructing said current nanolayer includes:
    depositing a plurality of nanoparticles; and
    manipulating the nanoparticles.

5. The method of claim 4, wherein said manipulating said nanoparticles includes moving substantially similar colloidal nanoparticles to shape said nanoparticles into an appropriate shape for the current nanolayer.

6. The method of claim 5, wherein said moving said nanoparticles includes pushing and pulling the nanoparticles with a scanning probe microscope tip.

7. The method of claim 4, wherein diameters of said plurality of nanoparticles are less than 30 nm.

8. The method of claim 4, wherein said nanoparticles include gold spherical particles.

9. The method of claim 8, wherein said gold particles are cross-linked and stabilized by treating them with di-thiols.

10. The method of claim 1, wherein said first surface is a surface of a substrate.

11. The method of claim 10, wherein said substrate includes hydroxylated material such as oxidized silicon or mica.

12. The method of claim 10, wherein said substrate includes gold, silver, copper, platinum, silver oxide, or aluminum oxide.

13. The method of claim 1, wherein said sacrificial layer includes a plurality of substantially ordered molecules.

14. The method of claim 13, wherein said plurality of substantially ordered molecules includes self-assembled monolayers.

15. The method of claim 14, wherein said self-assembled monolayers include monolayers of silane or alkylsiloxane.

16. The method of claim 1, wherein heights of said sacrificial layer and said current nanolayer are substantially similar.

17. The method of claim 1, wherein said depositing said sacrificial layer includes electrostatically depositing strands of polymers.

18. The method of claim 17, wherein said electrostatically depositing said strands of polymers includes:

charging the first surface; and successively treating the charged surface with solutions of oppositely charged polymers, such that thicknesses of the charged polymers and the current nanolayer are substantially similar.

19. The method of claim 18, wherein each layer of said charged polymers is between 1 and 10 nm thick.

20. The method of claim 1, wherein said sacrificial layer includes thiols, alcohols, amines, or carboxylic acids.

21. The method of claim 1, wherein said removing includes oxidizing said sacrificial layer using ozone.

22. The method of claim 21, wherein said oxidizing is performed under ultraviolet radiation.

23. The method of claim 1, further comprising:

fusing said nanolayers together to bolster the nanoscale object.

24. The method of claim 23, wherein said nanolayers are fused by applying di-thiol solution.

25. The method of claim 23, wherein said nanolayers are fused by applying a chemical or electrochemical process.

26. The method of claim 23, wherein said nanolayers are fused by applying a thermal process.

* * * * *

UNITED STATES PATENT AND TRADEMARK OFFICE
CERTIFICATE OF CORRECTION

PATENT NO. : 6,508,979 B1  Page 1 of 1
DATED : January 21, 2003
INVENTOR(S) : Aristides A. G. Requicha et al.

It is certified that error appears in the above-identified patent and that said Letters Patent is hereby corrected as shown below:

<u>Column 1,</u>
Line 9, add the following paragraph to the specification before the Background section
-- STATEMENT AS TO FEDERALLY SPONSORED RESEARCH
This invention was made with government support under Contract No. EIA-98-71775 awarded by the National Science Foundation; the government has certain rights in the invention. --

Signed and Sealed this

Eighth Day of April, 2003

JAMES E. ROGAN
*Director of the United States Patent and Trademark Office*